United States Patent
Pundak et al.

(10) Patent No.: US 11,803,255 B2
(45) Date of Patent: Oct. 31, 2023

(54) DIGITAL MARKING PREDICTION BY POSTURE

(71) Applicant: Microsoft Technology Licensing, LLC, Redmond, WA (US)

(72) Inventors: Gilad Pundak, Rehovot (IL); Yotam Livny, Gadera (IL); Yoel Yehezkel Einhoren, Petah Tiqwa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 17/335,342

(22) Filed: Jun. 1, 2021

(65) Prior Publication Data
US 2022/0382387 A1    Dec. 1, 2022

(51) Int. Cl.
| G06F 3/03 | (2006.01) |
|---|---|
| G06F 3/041 | (2006.01) |
| G06F 3/0354 | (2013.01) |
| G06F 3/044 | (2006.01) |

(52) U.S. Cl.
CPC ........ *G06F 3/0317* (2013.01); *G06F 3/03545* (2013.01); *G06F 3/044* (2013.01); *G06F 3/04162* (2019.05); *G06F 3/04186* (2019.05); *G06F 2203/04104* (2013.01)

(58) Field of Classification Search
CPC .............. G06F 3/0317; G06F 3/03545; G06F 3/04162; G06F 3/04186; G06F 3/044; G06F 2203/04104
See application file for complete search history.

(56) References Cited

U.S. PATENT DOCUMENTS

| 8,773,386 B2 | 7/2014 | Wilson et al. |
|---|---|---|
| 9,244,545 B2 | 1/2016 | Hinckley et al. |
| 9,569,045 B2 | 2/2017 | Westerman |
| 10,572,063 B2 | 2/2020 | Case et al. |
| 10,942,646 B2 | 3/2021 | Poon et al. |
| 2005/0212780 A1 | 9/2005 | Tokkonen |
| 2013/0300672 A1 | 11/2013 | Griffin |
| 2014/0098072 A1 | 4/2014 | Singh et al. |
| 2014/0204036 A1 | 7/2014 | Schillings et al. |

(Continued)

FOREIGN PATENT DOCUMENTS

| WO | 2015042292 A1 | 3/2015 |
|---|---|---|
| WO | 2015142391 A1 | 9/2015 |
| WO | 2018077761 A1 | 5/2018 |

OTHER PUBLICATIONS

Hinckley, et al., "Sensing Techniques for Tablet+Stylus Interaction", In Proceedings of the 27th Annual ACM Symposium on User Interface Software and Technology, Oct. 5, 2014, 10 Pages.

(Continued)

*Primary Examiner* — Michael Pervan
(74) *Attorney, Agent, or Firm* — Holzer Patel Drennan

(57) ABSTRACT

The method disclosed herein includes determining a user interaction pattern with respect to a digital marker, the user interaction pattern based at least in part on user interaction with a capacitive sensor of a computing device, determining a geometric characteristic of the digital marker, and generating a predicted digital marking position of the digital marker on a digital medium of the computing device based at least in part on the determined geometric characteristic of the digital marker and the determined user interaction pattern.

17 Claims, 6 Drawing Sheets

(56) References Cited

U.S. PATENT DOCUMENTS

| | | | |
|---|---|---|---|
| 2015/0062021 A1 | 3/2015 | Skaljak et al. | |
| 2015/0134572 A1* | 5/2015 | Forlines | G06F 3/04842 |
| | | | 706/11 |
| 2018/0129312 A1 | 5/2018 | Westhues et al. | |
| 2019/0310738 A1* | 10/2019 | Dyvik | G06F 3/0418 |
| 2020/0050321 A1* | 2/2020 | Dyvik | G06F 3/0447 |
| 2021/0041958 A1* | 2/2021 | Midya | G06V 30/1423 |

OTHER PUBLICATIONS

"International Search Report and Written Opinion Issued in PCT Application No. PCT/US22/027961", dated Aug. 25, 2022, 12 Pages.

Le, et al., "PredicTouch: A System to Reduce Touchscreen Latency using Neural Networks and Inertial Measurement Units", In Proceedings of the Interactive Surfaces and Spaces, ISS 2017, Oct. 17, 2017, pp. 230-239.

Zibreg, Christian, "Ios 9 Introduces Predictive Touch Technology That Should Be Crucial For Rumored Apple Stylus", Retrieved from: https://www.idownloadblog.com/2015/06/15/ios-9-predictive-touch/, Jun. 15, 2015, 11 Pages.

\* cited by examiner

DIGITAL MARKING PREDICTION BY POSTURE

BACKGROUND

Writing with a digital marker such as a stylus can suffer from problems with latency between the sensing of a touch of a digital marker and the actual marking. This can frustrate the user who may rewrite elements with the assumption that delayed marking represents a missed marking.

SUMMARY

The method disclosed herein includes determining a user interaction pattern with respect to a digital marker, the user interaction pattern based at least in part on user interaction with a capacitive sensor of a computing device, determining a geometric characteristic of the digital marker, and generating a predicted digital marking position of the digital marker on a digital medium of the computing device based at least in part on the determined geometric characteristic of the digital marker and the determined user interaction pattern.

The described technology provides implementations of systems and methods for digital marking. More specifically, the described technology provides implementations of systems and methods for predictive digital marking.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
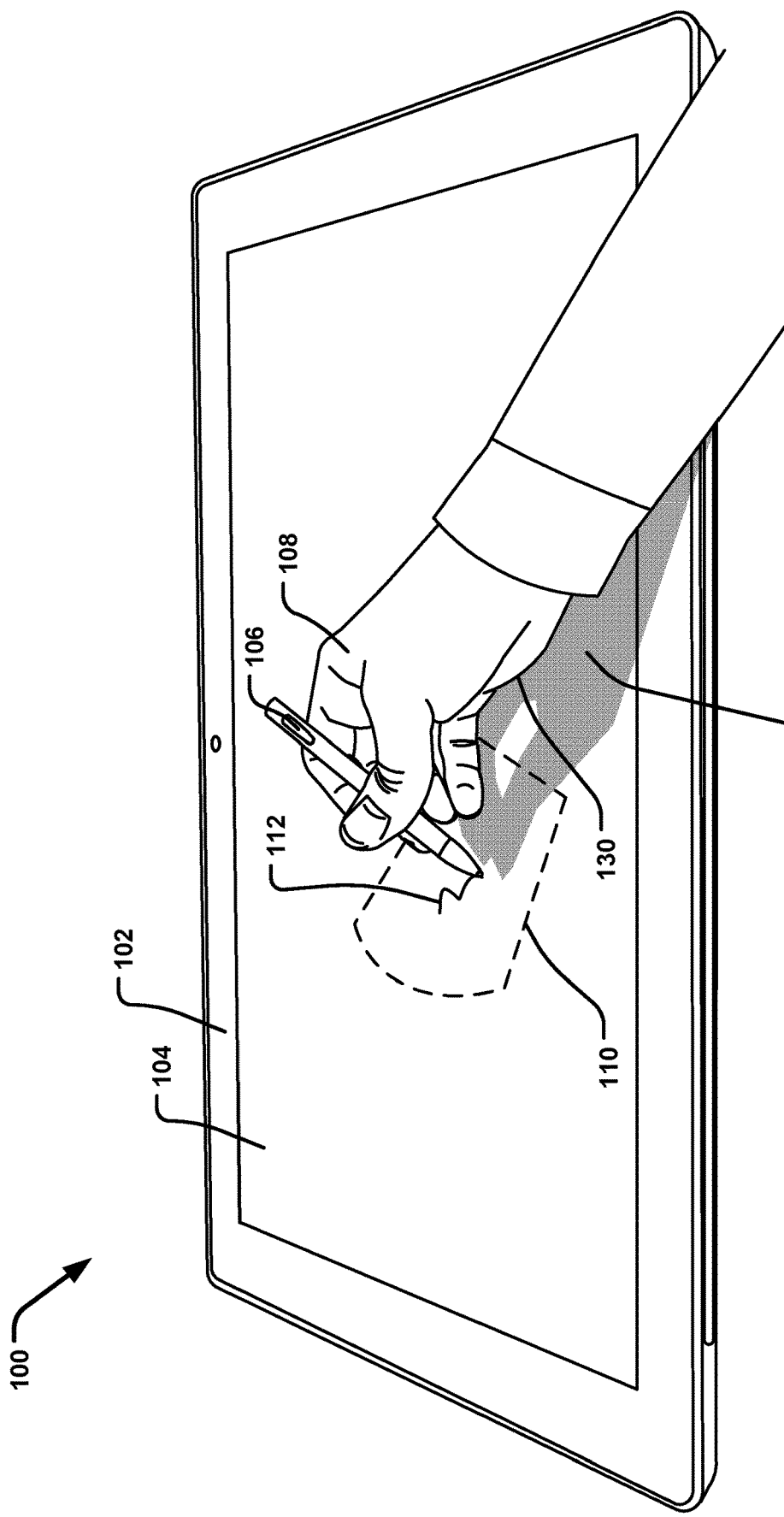
FIG. 1 illustrates an example system for predicting a digital marking position.

Writing with a digital marker can provide significant advantages over relying on typical mouse or trackpad systems, but latency can be an issue. An approach to improving the user experience is generating predictive markings in advance of a digital marker touching a digital marking medium. Accounting for a user's interaction with sensors of a device in addition to sensors in the digital marker itself may provide predictive advantages. Predicting a potential position of a marking on a digital medium of a device can be difficult and can complicate device design. For instance, every added sensor is a costly element, and relying on a digital marker sensor itself has limited application. The digital marker may be able to track its position and orientation as well as its velocity, but it does not necessarily indicate anything about characteristics of the user. Also, expecting a user to use equipment not traditionally deployed may be unrealistic. It may be advantageous to leverage different aspects of equipment essential to or already typically provided with digital marking media to improve marking prediction.

A device with a digital marking medium may interact with a digital marker to receive digital markings. The digital marking medium may also be a user interaction sensor, for instance, a capacitive sensor or touch sensor. The user interaction sensor may be used to receive either active or passive signals from the digital marker.

Furthermore, the user interaction sensor may also interact with the user beyond interactions generated by the digital marker. When writing with a digital marker on a digital medium, such as a touch-sensitive screen of a computing device, the user interaction sensor may sense interaction with anatomical features of the user while holding the digital marker. The user interaction sensor may sense, for example, one or more of a direct touch pattern of the anatomical feature, proximity of a pattern of the anatomical feature, and a shadow pattern cast by the anatomical feature.

Using the user interaction sensor and the digital marker sensors to predict potential marking positions may provide several advantages. The digital interaction sensor and the digital marker sensors may transmit data at a low level of hardware closer to the processor to allow for faster processing and faster prediction. This synergy may reduce latency in prediction models relative to systems that require further hardware or higher levels of processing.

From this sensor data, a device system may inferentially determine a user interaction pattern which may include characteristics of the user interaction with the marker device and/or characteristics of the user relevant to the marking. The sensor data can be used to determine user interaction patterns, for example, one or more of user handedness, user hand azimuth, and user hand size.

These user interaction patterns may be further used to determine characteristics of the user that may inform a marking prediction, for example, age, writing style, medical issues affecting writing, gender, motor capabilities, or handwriting. While default algorithms may initially be used for predictive marking, characteristics of the user may be used to further hone the prediction model and even customize the prediction model for the particular user over a period of use.

The prediction model may generate a probability distribution of plausible digital marker states to predict a most likely position of marking. The probability distributions may include or derive from uncertainties of the digital marker states. The digital marker states may include geometric characteristics of the digital marker, for example, orientation or position of the digital marker relative to the digital marking medium. The probability of a particular marker state may be informed by a variety of data. Data from the digital marker itself may include, for example, the geometric characteristics and a digital marker velocity.

The prediction model may rely on hysteresis to determine a likely marking position. Probability distributions of digital marker states from prior predictive iterations may be used to inform the predictive model. In an implementation, current user interaction patterns may be determined from sensed user interaction with a digital marking medium. From these patterns, an inference engine may generate a first probability distribution of digital marker states. The first probability distribution of digital marker states may be combined with a prior probability distribution of digital marker states to generate a second probability distribution of digital marker states to reduce the number of digital marker states used to predict a marking. This may be done, for example, using convolution of the distributions. The second probability distribution may be further transformed and combined with current data, for example, current data regarding sensed user interaction and/or geometric characteristics of the digital marker to further reduce the number of potential digital marker states in a third probability distribution of digital marker states. This may be done using an inference engine and may use a filter such as a Kalman filter or other state machine. From this third probability distribution of marker states, the inference engine may predict a predicted marker position. This method may provide a significantly reduced set of possible digital marker states to reduce the range of potential marking positions relative to systems which do not account for user interaction with the user interaction sensor.

A predicted marker position generated from the probability distributions of marker states may also be further reconciled with predictions generated by other models. For example, the inference engine of an operating system may use predictive modeling that does not rely on digital marker sensor data or relies solely on existing sensor data to predict a marking position. These processes may be faster, as they rely on the OS to software stack, but they may suffer from a number of assumptions and may be better developed by accounting for the current sensed data from the digital marker and the user interaction sensor. An inference engine may combine these data to generate a more robust predicted marking position.

FIG. 1 illustrates an example system 100 for predicting a digital marking position. The system 100 has a device 102 with a user interaction sensor 104. The device may be an implementation of computing device 500. In the illustrated implementation, the user interaction sensor 104 is a capacitive sensor. A user 108 interacts with a digital marker 106 to make a marking 112. The user 108 also interacts with user interaction sensor 104 when making marking 112. The interaction with user interaction sensor 104 may be characterized, for example, by a touch pattern 130 of and/or a shadow 132 cast by an anatomical feature of user 108. The anatomical feature may be an appendage, such as an arm and/or hand of user 108.

The user interaction may be indicative of a user interaction pattern, for example, a user handedness, a user interaction azimuth, or a user hand size; an inference engine may determine the user interaction pattern based at least in part on interaction with the user interaction sensor 104. The user handedness may be an indication of whether the user 108 is right-handed, left-handed, or ambidextrous. The user interaction azimuth can be from a perspective, for example, from a position on and/or axis of a user interaction sensor 104, from a position on and/or orientation of a digital marker, or from a position dynamically established relative to the user interaction (e.g., a perspective from an element of a touch pattern 130 or a shadow 132). The user handedness may affect the hand posture and may limit the potential areas where a marking can be made relative to a digital marker state.

Determining the user interaction pattern may help to reduce the number of plausible positions for predicted marking. As illustrated, the user 108 is right-handed and has a curved hand posture with a portion of the hand resting on the user interaction sensor 104. From this posture, there is a limited reach area 110 for the digital marker 106. By accounting for the limited reach area 110 using the user interaction pattern, the predicted marking position may be limited to a position in the limited reach area 110.

As illustrated, user 108 is attempting to draw a "3" with the digital marker 106. Fast prediction models in the operating system of device 102 have greater difficulty predicting curved markings like those required for writing a "3." The prediction models may benefit from information regarding user interaction patterns.

In an implementation, data generated from the digital marker 106 may be used to determine a geometric characteristic of the digital marker 106. The digital marker 106 may have sensors, for example, one or more of accelerometers, gyros, capacitive sensors, motion sensors, tilt sensors, device-specific digitizer transceivers, and pressure sensors. The digital marker 106 may use the sensors to determine or transmit data reflecting two-dimensional and/or three-dimensional geometric characteristics, for example, one or more of orientation, position, velocity of movement, tilt, azimuth, areas or elements of the digital marker 106 interacting with the user 108, and changes in these geometric characteristics, perhaps relative to the user interaction sensor 104. A digital marker state may include data regarding one or more of the geometric characteristics of the digital marker 106 that may be relevant to predicting a marking position.

In an implementation, data generated from the user interaction sensor 104 may be used to determine a user interaction pattern with respect to the digital marker 106. The user interaction sensor 104 may have interaction sensors, for example, one or more of capacitive sensors, motion sensors, accelerometers, click sensors, light sensors, and temperature sensors. The interaction sensors may sense user interaction with the user interaction sensor 104, for example, by sensing one or more of touch pattern 130 of and/or shadow 132 cast by an anatomical feature of user 108. The nature of physical user interaction and the shadow cast may help indicate a user interaction pattern that may improve the model for determining a predicted marking position. The data generated by the interaction sensors may provide information about the interaction pattern, for example, one or more of a user handedness, user hand size, and user hand azimuth. The interaction pattern can be determined relative to the user interaction sensor 104, the device 102, and/or the digital marker 106. From the user interaction pattern, an inference engine can determine likely marking positions and/or likely hand postures. As illustrated in FIG. 1, the hand posture sensed can be used to limit an area of potential marking to the limited reach area 110. The inference engine may further determine characteristics and/or classifications of the user 108 from the user interaction pattern, for example, one or more of age, writing style, medical issues affecting writing, gender, motor capabilities, or handwriting. While default algorithms may initially be used for predictive marking, characteristics of the user 108 may be used to further hone a prediction model and even customize the model for user 108 over a period of use. Accounting for user characteristics may allow predictive models to better predict a next marking based at least in part on one or more of past user behavior and behavior indicative of the type of user.

The inference engine may use derived user interaction patterns and other sensed user interaction data to generate potential digital marker 106 state data and associated probabilities and/or uncertainties for the states. The inference engine may generate a first digital marker state probability distribution for potential digital marking states from the user interaction data, a user interaction pattern, and/or a user posture. Because the user interaction data may indicate postures and/or characteristics of the individuals, the user interaction data can limit the potential digital marker states anticipated, hence limiting the location(s) of a predicted mark. Using digital marker state probability distributions may better account for uncertainties in data than using standard maps of possibilities without accompanying probabilities or uncertainties.

The inference engine may combine or otherwise coalesce the first digital marker state probability distribution with a prior digital marker state probability distribution determined earlier to further qualify the potential digital marker states used in predicting a marking. For example, the inference engine may perform a convolution of the digital marker state probability distributions. This operation may yield a second digital marker state probability distribution representing a further limit on the potential digital marker states and, consequently the potential location(s) of a predicted mark. Accounting for prior digital marker state probability distributions may narrow the range of possible predicted marking positions, as there is a likelihood that in the increment of time between markings the prior marking data will be indicative of the next marking. For the purposes of this specification, when data is combined or coalesced, it should be appreciated that this may involve, for example, one or more operations of convolution, linear transformation, machine learning inference, state machine processing, Kalman filter processing, and processing by other inferential methods. The combination or coalescence may result in the number of digital marker states or marking positions being changed overall, may result in weighting of probabilities of some of coincident or intersected digital marker states or marking positions, or may result in weighted probabilities of marker states where no marker states are eliminated as possibilities from the first and prior marker states probability distributions.

The inference engine may further transform the second digital marker state probability distribution. The transformation may better allow data to be used in a state model for predicting marking positions. In the transformation, the first state may be used to predict the current state from previous data using Kalman state model parameters (e.g., velocity, direction, and consistency in inking prediction). This can be done using, for instance, a matrix multiplication. An example matrix multiplication is between a two-dimensional or three-dimensional location matrix (perhaps with accompanying uncertainties in each dimension) and a two-dimensional or three-dimensional velocity matrix (perhaps with accompanying uncertainties and potentially further considering direction scatter data). A next step in the transformation may be combining a predicted Gaussian with the sensor data (e.g., location and signal-to-noise ratio sensor). The second step may include a matrix multiplication between the resulting matrix from the prior step and a second matrix representing two-dimensional or three-dimensional location sensor and signal-to-noise ratio sensor data. The result of the transformation may be a Gaussian where its center is a most probable predicted digital marking position.

The inference engine may use the transformed second digital marker state probability distribution with current digital marker 106 sensor data and user interaction sensor 104 data to yield a third digital marker state probability distribution. Accounting for current sensor data, perhaps sensor data of the digital marker and/or the user interaction sensor may bring a fuller picture of possible marker states, and, hence, potential marking positions. The inference engine may use a state machine or a filter, for example, a Kalman filter to coalesce this data. The current digital marker 106 sensor data and user interaction sensor 104 data may be inputted directly or may be processed by the inference engine to yield potential digital marking states, potential probabilities associated with those digital marking states, and/or a current digital marker state probability distribution.

The third digital marker state probability distribution may represent probabilities of any particular marker states that are plausible based at least in part on the data ingested by the inference engine. The inference engine may predict the digital marking position based at least in part on the third digital marker state probability distribution. In an implementation, the inference engine predicts the marking position from a most probable digital marker state. In another implementation, the inference engine may predict the marking position by determining a marking position probability distribution from the third digital marker state probability distribution and, from the marking position probability distribution, predicting the digital marking position.

The relationship between predicted marking positions and digital marking states may be based at least in part on geometric characteristics of the digital marker 106. For example, an orientation and a position of a digital marker 106 may only present a specific area of positions over which a digital marking can be made by the digital marker 106. The inference engine limiting these potential digital marker states and assessing the probability of each of those states can considerably limit this area and generate a highly likely position of marking. In an implementation, a digital marking position may derive from a pen state by determining centroids in axes of each dimension considered and calculating signal-to-noise-ratios, perhaps using phase differences on pen position electrodes on each axis.

The inference engine may preemptively mark at the predicted digital marking position before accounting for other data. Alternatively or additionally, the inference engine may incorporate data generated by the operating system or other elements of the device 102 or inference engine that use software-based predictive models with the data yielded from one or more of the third digital marker state probability distribution, a marking position probability distribution, and the predicted marking position to yield a validate predicted digital marker position. These software-based predictive models may not rely on sensor data or may rely on older sensor data to determine a reasonable prediction. These software-based predictive models may operate more quickly and/or frequently and may provide a predicted digital marking position or data to be combined with the sensor-based data. The software-based predicted position may be considered a "wet ink" marking that is not finalized as a "dry ink" marking until the sensor-based data is combined or otherwise accounted for. Combining the sensor-based predicted position data with the software based predicted position data may yield a validated predicted digital marking position. The recently yielded third digital marker state probability distribution may be used as the prior digital marker state probability in a next or later iteration.

Alternative implementations are contemplated in which the digital marker state probability distributions are used to generate marking position probability distributions before being coalesced or combined such that the inference engine yields marking position probability distributions at every step. In this implementation, the inference engine may use the first digital marker state probability distribution to determine a first marking position probability distribution. The inference engine may combine the first marking position probability distribution and the prior marking position probability distribution to yield a second marking position probability distribution. The inference engine may take current digital marker 106 sensor data and user interaction sensor 104 data and combine them to determine one or more of a sensor digital marker state probability distribution and a sensor marking position probability distribution. The inference engine may combine the second marking position probability distribution with the one or more of the current sensor digital marker state probability distribution and the current sensor marking position probability distribution. These distributions may be combined using one or more of convolution, a linear transformation, a state machine, a machine learning implementation, a Kalman filter, and other inferential methods. From this combination the inference engine may yield a third marking position probability distribution. From the third marking position probability distribution, the inference engine may directly predict a marking position or may coalesce the predicted position or the third marking position probability distribution with other software-based predictions as disclosed to predict the marking position.

Figure 2:
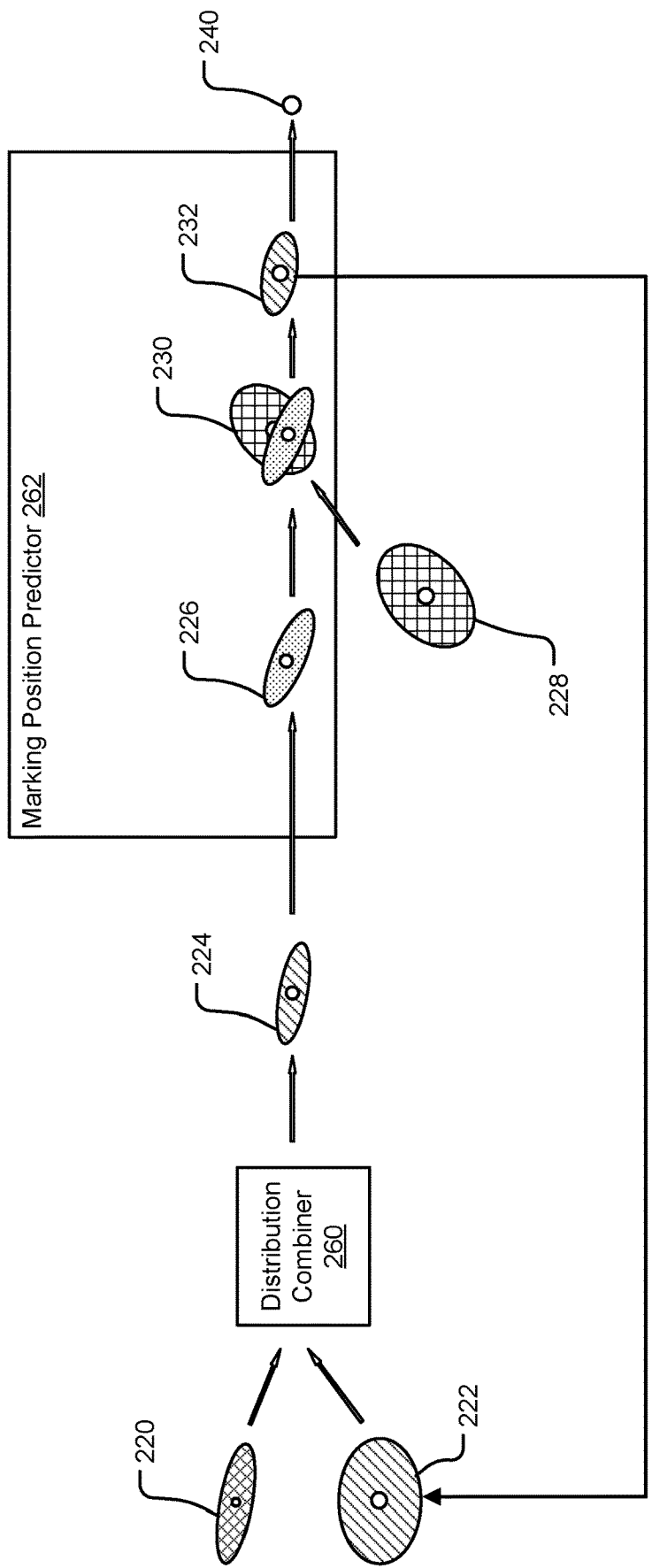
FIG. 2 illustrates another example system for predicting a digital marking position.

FIG. 2 illustrates another example system 200 for predicting a digital marking position. User interaction sensor data may be provided by a user interaction sensor. The user interaction sensor data may be used to determine a first digital marker state probability distribution 220. As illustrated, the first marker probability state distribution 220 represents a distribution of digital marker state probabilities.

A prior digital marker state probability distribution 222 may be incorporated into the system 200 to account for a likelihood that the prior digital marker state probability distribution 222 will have an effect on a next digital marking position. The first marker probability state distribution 220 may be combined or coalesced with the prior digital marker state probability distribution 222 using a distribution combiner 260. The distribution combiner 260 may be an element of an inference engine of a computing device. The distribution combiner 260 may combine the data by, for example, by linear transformation, convolution of the digital marker state probability distributions 220 and 222, combination and weighting of marker state probabilities, and/or applying relative weighting to probabilities of only marker states that exist in both digital marker state probability effect distributions 220 and 222. From the first digital marker state probability distribution 220 and the prior digital marker state probability distribution 222, the distribution combiner 260 yields a second digital marker state probability distribution 224. In implementations, the second digital marker state probability distribution represents fewer marker states than either the prior digital marker state probability distribution or the first digital marker state probability distribution.

A marking position predictor 262 may then combine or coalesce the second digital marker state probability distribution 224 with current sensor data 228 and predict a marking position from the combination. The marking position predictor 262 may be an element of the inference engine. In the illustrated implementation, the marking position predictor 262 may initially transform the second digital marker state probability distribution 224 before the combination or coalescence to generate a predicted or transformed second digital marker state probability distribution 226. For example, in the transformation, the first state may be used to predict the current state from previous data using Kalman state model parameters (e.g., velocity, direction, and consistency in inking prediction). This can be done using, for instance, a matrix multiplication. An example matrix multiplication is between a two-dimensional or three-dimensional location matrix (perhaps with accompanying uncertainties in each dimension) and a two-dimensional or three-dimensional velocity matrix (perhaps with accompanying uncertainties and potentially further considering direction scatter data). A next step in the transformation may be combining a predicted Gaussian with the sensor data (e.g., location and signal-to-noise ratio sensor). The second step may include a matrix multiplication between the resulting matrix from the prior step and a second matrix representing two-dimensional or three-dimensional location sensor and signal-to-noise ratio sensor data. The result of the transformation may be a Gaussian where its center is a most probable predicted digital marking position. In this implementation, the predicted or transformed second digital marker state probability distribution 226 may be combined with the current sensor data 228. Implementations are also contemplated where the marking position predictor 262 does not transform the second digital marker state probability distribution 224, and the second digital marker state probability distribution 224 is combined with the current sensor data. The combination 230 may be processed by the marking position predictor 262 to yield a third digital marker state probability distribution 232.

In implementations, the current sensor data 228 may include both digital marker data and user interaction sensor data. As previously stated, the first digital marker state probability distribution is based at least in part on current user interaction data. For the purposes of this specification when the term, "current," is used, it may imply that the data is from the same time or sample or may imply that the times or samples are proximate in time. Further if a prior operation uses current sensor data, and a later operation uses current sensor data, the later current sensor data may be the same data or may be data generated that is current at the time of each operation.

The marking position predictor 262 may include one or more of a Kalman filter, Kalman smoother, alpha beta filter, inverse-variance weighting, covariance intersection, stochastic relationship, state-transition matrix, Kernel adaptive filter, recursive least squares filter, particle filter estimator, moving horizon estimator, recursive Bayesian estimator, and a predictor-corrector method. A Kalman filter may include one or more of a Frequency-Weighted Kalman filter, Extended Kalman filter, Unscented Kalman filter, discriminative Kalman filter, adaptive Kalman filter, Kalman-Bucy filter, hybrid Kalman filter.

In an implementation in which the marking position predictor 262 includes a Kalman filter, the combination may transform the second digital marker state probability distribution 224 using a state model to yield a predicted or transformed second digital marker state probability distribution 226 in a prediction step. The relationship between uncertainty and probability may be that the larger the uncertainty the wider the range of plausible outcomes (e.g., a wider Gaussian). The transformation may be generated using a state model. Measurements may be taken using sensors (e.g., digital marker sensors and/or user interaction sensors) to generate current sensor data 228. The current sensor data 228 may be formatted to match the format of the state data in the predicted or transformed second digital marker state probability distribution 226.

The current sensor data 228 may be formatted to include noise from measurement. In an implementation, the noise from the measurements may be represented as probability distributions, perhaps Gaussian and/or independent probability distribution, and/or may be modeled as measurements with otherwise determined accompanying uncertainties. This data may be derived from statistical methods utilizing historical measurement uncertainty or noise data. Depending on the implementation, the predicted or transformed second digital marker state probability distribution 226 may be combined or compared with the current sensor data 228 to update the model. The updated model may yield a prediction for the state variables, the prediction being the third digital marker state probability distribution 232. From the third digital marker state probability distribution 232, a sensor-based predicted marking position can be generated.

In an alternative embodiment, instead of digital marker state probability distributions being used and compared in this procedure, the states can be used to manifest plausible marking position probability distributions with the marking positions being the state variables to yield a predicted marking position. In an implementation, a digital marking position may derive from a pen state by determining centroids in axes of each dimension considered and calculating signal-to-noise-ratios, perhaps using phase differences on pen position electrodes on each axis.

After a sensor-based predicted marking position is generated, a mark may be made on a display at the predicted position in anticipation of a digital marker touching the display to generate a marking. Alternatively or additionally, an inference engine may further compare the predicted marking position with software-based marking position predictions generated by a computer system that do not rely on recent or perhaps any sensor readings. For example, the other, software-based predicted marking positions may be generated based at least in part on knowledge of prior markings and behavior of the user operating the digital marker. In this implementation, the potential marking position may be reconciled from both the sensor data predicted marking position and other marking positions by, for example, taking an average of the positional coordinates and yielding a resulting average coordinate. While the sensor-based and software-based predicted marking positions may both be based at least in part on one or more of sensor data and software processing, this specification distinguishes the sensor-based predicted marking positions as ones predicted using current and prior sensor data to determine probabilistic models and yield a sensor-based prediction. The software-based predicted marking positions are those yielded without instant access to sensor data. Incorporating software-based digital marker position predictions with the sensor-based digital marker position predictions may yield validated digital marker position predictions.

Figure 3:
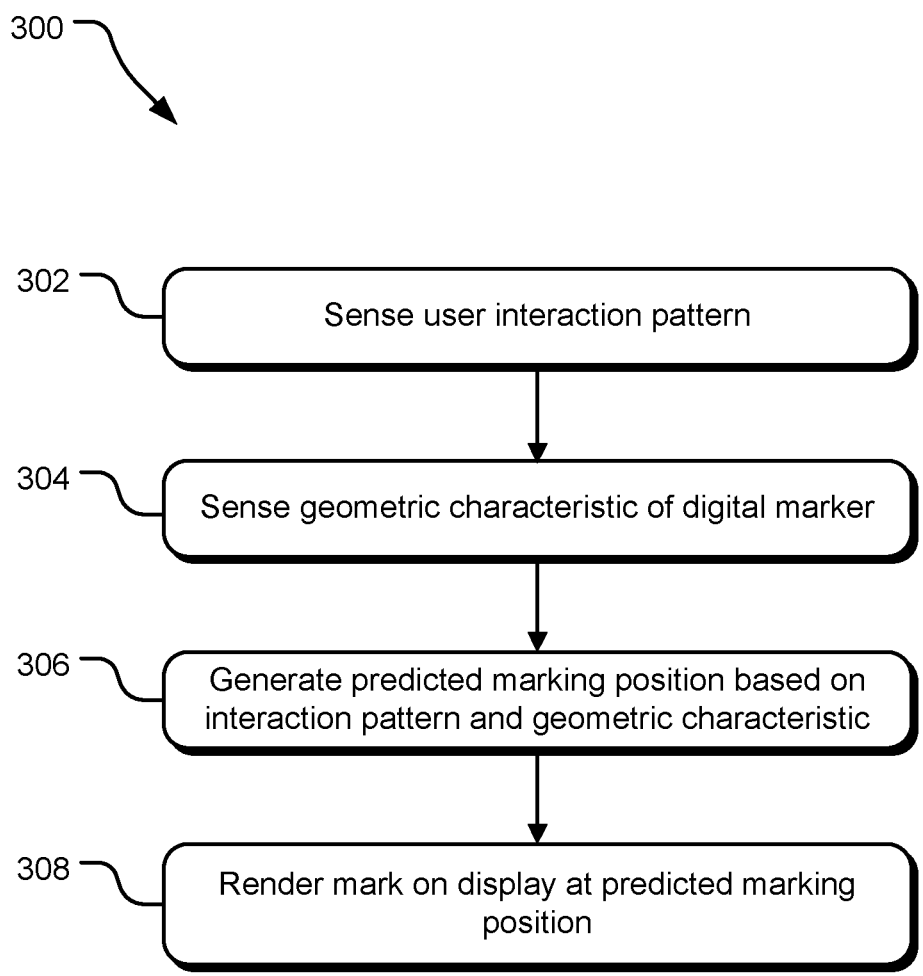
FIG. 3 illustrates an example operations for generating a predicted marking.

FIG. 3 illustrates an example operations 300 for generating a predicted marking. Determining operation 302 determines a user interaction pattern with respect to a digital marker. The user interaction pattern may be based at least in part on user interaction with a capacitive sensor of a device. For example, the user may interact with a digital marker to make a marking. The user may concurrently interact with user interaction sensor when making marking. The interaction with the user interaction sensor may be characterized, for example, by a touch pattern of and/or a shadow cast by an anatomical feature of a user. The anatomical feature may be an appendage, such as an arm and/or hand of the user.

The user interaction may be indicative of a user interaction pattern, for example, a user handedness, a user interaction azimuth, or a user hand size. An inference engine may determine the user interaction pattern based at least in part on interaction with the user interaction sensor. The user handedness may be an indication of whether the user is right-handed, left-handed, or ambidextrous. The user interaction azimuth can be from a reference or perspective, for example, from a position on or axis of a user interaction sensor, from a position on or orientation of a digital marker, from a position dynamically established relative to the user interaction. The user handedness may affect the hand posture and may limit the potential areas where a marking can be made relative to a digital marker state.

Determining the user interaction pattern in determining operation 302 may help to reduce the number of plausible positions for predicted marking. A user may have a hand posture with a portion of the hand resting on the user interaction sensor. From this posture, there is a limited reach area for the digital marker. By accounting for the limited reach area using the user interaction pattern, the predicted marking position may be limited to a position in the limited reach area. Fast prediction models in the operating system of device have greater difficulty predicting some patterns, for example, curved markings. The prediction models may benefit from information regarding user interaction patterns.

In an implementation, data generated from the user interaction sensor may be used to determine a user interaction pattern with respect to the digital marker. The user interaction sensor may have interaction sensors, for example, one or more of capacitive sensors, motion sensors, accelerometers, click sensors, light sensors, and temperature sensors. The interaction sensors may sense user interaction with the user interaction sensor, for example, by sensing one or more of touch pattern of and/or shadow cast by an anatomical feature of user. The data generated by the interaction sensors may provide information about the interaction pattern, for example, one or more of a user handedness, user hand size, and user hand azimuth. The interaction pattern can be determined relative to the user interaction sensor, the device, and/or the digital marker. From the user interaction pattern, an inference engine can determine likely marking positions and/or likely hand postures. A hand posture sensed can be used to limit an area of potential marking to the limited reach area. The inference engine may further determine characteristics and/or classifications of the user from the user interaction pattern, for example, one or more of age, writing style, medical issues affecting writing, gender, motor capabilities, or handwriting. While default algorithms may initially be used for predictive marking, characteristics of the user may be used to further hone a prediction model and even customize the model for user over a period of use.

A determining operation 304 determines a geometric characteristic of the digital marker. In an implementation, data generated from the digital marker may be used to determine a geometric characteristic of the digital marker. The digital marker may have sensors, for example, one or more of accelerometers, gyros, capacitive sensors, motion sensors, tilt sensors, device-specific digitizer transceivers, and pressure sensors. The digital marker may use the sensors to determine or transmit data reflecting two-dimensional and/or three-dimensional geometric characteristics, for example, one or more of orientation, position, velocity of movement, tilt, azimuth, areas or elements of the digital marker interacting with the user, and changes in these geometric characteristics, perhaps relative to the user interaction sensor. A digital marker state may include data regarding one or more of the geometric characteristics of the digital marker that may be relevant to predicting a marking position.

A generating operation 306 generates a predicted digital marking position of the digital marker based at least in part on the determined geometric characteristic of the digital marker and the determined user interaction pattern. The generating operation 306 may be an implementation of operations 400. The generating operation 306 may use the inference engine to derive user interaction patterns and other sensed user interaction data to generate potential digital marker state data and associated probabilities and/or uncertainties for the states. The inference engine may generate a first digital marker state probability distribution for potential digital marking states from the user interaction data, a user interaction pattern, and/or a user posture. Because the user interaction data may indicate postures and/or characteristics of the individuals, the user interaction data can limit the potential digital marker states anticipated, hence limiting the location(s) of a predicted mark. User interaction sensor data may be provided by a user interaction sensor. The user interaction sensor data may be used to determine a first digital marker state probability distribution. The first marker probability state distribution represents a distribution of digital marker state probabilities based at least in part on the user interaction patterns.

The generating operation 306 may use the inference engine to combine or otherwise coalesce the first digital marker state probability distribution with a prior digital marker state probability distribution determined earlier to further qualify the potential digital marker states used in predicting a marking. A prior digital marker state probability distribution may be incorporated into the system to account for a likelihood that the prior digital marker state probability distribution will have an effect on a next marking position. The first marker probability state distribution may be combined or coalesced with the prior digital marker state probability distribution using a distribution combiner. From the first digital marker state probability distribution and the prior digital marker state probability distribution, the distribution combiner yields a second digital marker state probability distribution.

The generating operation 306 may further use the inference engine to further transform the second digital marker state probability distribution. In the transformation, the first state may be used to predict the current state from previous data using Kalman state model parameters (e.g., velocity, direction, and consistency in inking prediction). This can be done using, for instance, a matrix multiplication. An example matrix multiplication is between a two-dimensional or three-dimensional location matrix (perhaps with accompanying uncertainties in each dimension) and a two-dimensional or three-dimensional velocity matrix (perhaps with accompanying uncertainties and potentially further considering direction scatter data). A next step in the transformation may be combining a predicted Gaussian with the sensor data (e.g., location and signal-to-noise ratio sensor). The second step may include a matrix multiplication between the resulting matrix from the prior step and a second matrix representing two-dimensional or three-dimensional location sensor and signal-to-noise ratio sensor data. The result of the transformation may be a Gaussian where its center is a most probable predicted digital marking position. The inference engine may use the transformed second digital marker state probability distribution with current digital marker sensor data and user interaction sensor data to yield a third, predicted digital marker state probability distribution based at least in part on an existing and potentially trained state model. The inference engine may use a state machine or a filter, for example, a Kalman filter to coalesce and/or transform this data.

In an alternative embodiment, instead of digital marker state probability distributions being used and compared in this procedure, the states can be used to manifest plausible marking position probability distributions with the marking positions being the state variables to yield a predicted marking position.

The third digital marker state probability distribution may represent probabilities of any particular marker states that are plausible based at least in part on the data ingested by the inference engine. The inference engine may predict the digital marking position based at least in part on the third digital marker state probability distribution. In implementations, the inference engine may calculate current state probabilities and extracts the most probable position from it.

In an implementation, the inference engine predicts the marking position from a most probable digital marker state. In another implementation, the inference engine may predict the marking position by determining a marking position probability distribution from the third digital marker state probability distribution and from the marking position probability distribution predicting the digital marking position. In implementations using a Kalman filter, the Kalman filter may yield a digital marking position Gaussian with the center of the Gaussian (e.g., position of highest probability and/or having the last uncertainty) being the predicted marking position.

The relationship between predicted marking positions and digital marking states may be based at least in part on geometric characteristics of the digital marker. For example, an orientation and a position of a digital marker may only present a specific area of positions over which a digital marking can be made by the digital marker. The inference engine limiting these potential digital marker states and assessing the probability of each of those states can considerably limit this area and generate a highly likely position of marking.

In an implementation, generating operation 306 may use the inference engine to combine the data yielded from one or more of the third digital marker state probability distribution, a marking position probability distribution, and the predicted marking position with data generated by the operating system or other elements of the device or inference engine that use software-based predictive models to predict the position. Combining the sensor-based predicted position data with the software based predicted position data may yield a more robust predicted digital marking position.

Rendering operation 308 renders a predicted mark on a display. The predicted mark may be rendered or displayed before the user touches the user interaction sensors with the digital marker. The rendering operation 308 may use the inference engine to preemptively mark at the predicted digital marking position before accounting for other data or receiving a digital marker touch on a sensor. Alternatively or additionally, the rendering operation 308 may combine the predicted positions yielded by the different methods by one or more of averaging the coordinates of predicted markings generated by different models, taking a median of the coordinates, ranking and choosing a best predicted marking position, or using a consensus mechanism to determine the predicted marking. The recently yielded third digital marker state probability distribution may be used as the prior digital marker state probability in a next or later iteration.

Figure 4:
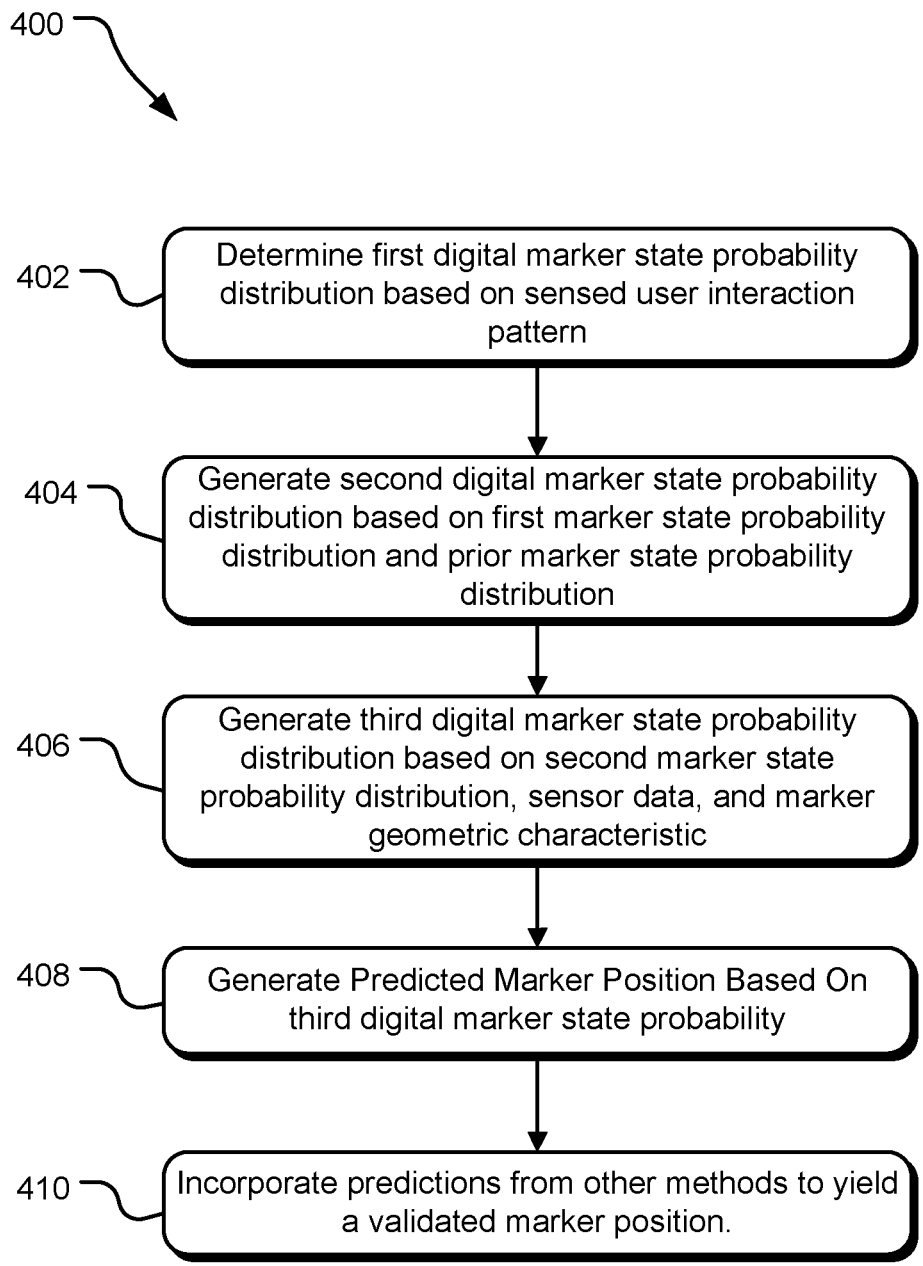
FIG. 4 illustrates an example operations for generating a predicted marking position.

FIG. 4 illustrates an example operations 400 for generating a predicted marking position. The operations 400 may be an example implementation of generating operation 306. determining operation 402 determines a first marker probability state based at least in part on a sensed user interaction pattern. The determining operation 402 may use the inference engine to derive user interaction patterns and other sensed user interaction data to generate potential digital marker state data and associated probabilities and/or uncertainties for the states. Determining operation 402 may use inference engine to generate a first digital marker state probability distribution for potential digital marking states from the user interaction data, a user interaction pattern, and/or a user posture. Because the user interaction data may indicate postures and/or characteristics of the individuals, the user interaction data can limit the potential digital marker states anticipated, hence limiting the location(s) of a predicted mark. The user interaction sensor data may be used to determine a first digital marker state probability distribution. The first marker probability state distribution represents a distribution of digital marker state probabilities based at least in part on the user interaction patterns.

Generating operation 404 generates a second digital marker state probability distribution based at least in part on the first digital marker state probability distribution and a prior digital marker state probability distribution. The generating operation 306 may use the inference engine to combine or otherwise coalesce the first digital marker state probability distribution with a prior digital marker state probability distribution determined earlier to further qualify the potential digital marker states used in predicting a marking. A prior digital marker state probability distribution may be incorporated into the system to account for a likelihood that the prior digital marker state probability distribution will have an effect on a next marking position. The first marker probability state distribution may be combined or coalesced with the prior digital marker state probability distribution using a distribution combiner. The distribution combiner may be an element of an inference engine of a computing device. The distribution combiner may combine the data by, for example, linear transformation, convolution of the digital marker state probability distributions, combination and weighting of marker state probabilities, and/or applying relative weighting to probabilities of only marker states that exist in digital marker state probability effect distributions to be combined. From the first digital marker state probability distribution and the prior digital marker state probability distribution, the distribution combiner yields a second digital marker state probability distribution.

For the purposes of this specification, when the operations 400 combine or coalesce data, it may include, for example, one or more operations of convolution, linear transformation, machine learning inference, state machine processing, Kalman filter processing, and processing by other inferential methods. The combination or coalescence may, for example, result in the number of digital marker states or marking positions being changed overall, result in weighted probabilities of some of coincident or intersected digital marker states or marking positions, or result in weighted probabilities of marker states where no marker states are eliminated as possibilities from the first and prior marker states probability distributions.

Generating operation 406 generates a third digital marker state probability distribution based at least in part on one or more of the second digital marker state probability distribution, the sensor data, and the marker geometric characteristic. The generating operation 406 may further use the inference engine to further transform the second digital marker state probability distribution. The inference engine may use the transformed second digital marker state probability distribution with current digital marker sensor data and user interaction sensor data to yield a third, predicted digital marker state probability distribution based at least in part on an existing and potentially trained state model. The inference engine may use a state machine or a filter, for example, a Kalman filter to coalesce and/or transform this data. The current digital marker sensor data and user interaction sensor data may be inputted directly or may be processed by the inference engine to yield one or more of potential digital marking states, potential probabilities and/or uncertainties associated with those digital marking states, and a third digital marker state probability distribution.

The marking position predictor may include one or more of a Kalman filter, Kalman smoother, alpha beta filter, inverse-variance weighting, covariance intersection, stochastic relationship, state-transition matrix, Kernel adaptive filter, recursive least squares filter, particle filter estimator, moving horizon estimator, recursive Bayesian estimator, and a predictor-corrector method. A Kalman filter may include one or more of a Frequency-Weighted Kalman filter, Extended Kalman filter, Unscented Kalman filter, discriminative Kalman filter, adaptive Kalman filter, Kalman-Bucy filter, hybrid Kalman filter.

In an implementation in which the marking position predictor includes a Kalman filter, the combination may transform the second digital marker state probability distribution using a state model to yield a predicted or transformed second digital marker state probability distribution in a prediction step. Measurements may be taken using sensors (e.g., digital marker sensors and/or user interaction sensors) to generate current sensor data. The current sensor data may be formatted to match the format of the state data in the predicted or transformed second digital marker state probability distribution. The current sensor data may be formatted to include noise from measurement. In an implementation, the noise from the measurements may be represented as a probability distribution, perhaps a Gaussian and/or independent probability distribution and/or may be modeled as measurements with accompanying uncertainties. Depending on the implementation, the predicted or transformed second digital marker state probability distribution may be combined or compared with the current sensor data to update the model. The updated model may yield a prediction for the state variables, the prediction being the third digital marker state probability distribution. From the third digital marker state probability distribution, a predicted marking position can be generated.

In an alternative embodiment, instead of digital marker state probability distributions being used and compared in this procedure, the states can be used to manifest plausible marking position probability distributions with the marking positions being the state variables to yield a predicted marking position.

The third digital marker state probability distribution may represent probabilities of any particular marker states that are plausible based at least in part on the data ingested by the inference engine.

Generating operation 408 generates a predicted digital marking position based at least in part on the third digital marker state probability distribution. In an implementation, the generating operation 408 uses the inference engine to predict the marking position from a most probable digital marker state. In another implementation, the inference engine may predict the marking position by determining a marking position probability distribution from the e.g., third digital marker state probability distribution and from the marking position probability distribution predicting the digital marking position.

The relationship between predicted marking positions and digital marking states may be based at least in part on geometric characteristics of the digital marker. For example, an orientation and a position of a digital marker may only present a specific area of positions over which a digital marking can be made by the digital marker. The inference engine limiting these potential digital marker states and assessing the probability of each of those states can considerably limit this area and generate a highly likely position of marking.

Incorporating operation 410 incorporates data generated by the operating system with other software-based predictive models with the data yielded from one or more of the third digital marker state probability distribution, a marking position probability distribution, and the sensor-based predicted marking position to yield a validated predicted marking position. These software-based predictive models may not rely on sensor data or may rely on older sensor data to determine a reasonable prediction. These software-based predictive models may operate more quickly and/or frequently and may provide a predicted digital marking position or data to be combined with the sensor-based data. The software-based predicted position may be considered a "wet ink" marking that is not finalized as a "dry ink" marking until the more updated, sensor-based data is combined or otherwise accounted for. Combining the sensor-based predicted position data with the software based predicted position data may yield a more robust predicted digital marking position. The incorporating operation 410 may combine the predicted positions yielded by the different methods by one or more of averaging the coordinates of predicted markings generated by different models, taking a median of the coordinates, ranking and choosing a best predicted marking position, or using a consensus mechanism to determine the predicted marking. The third digital marker state probability distribution may be used as the prior digital marker state probability in a next or later iteration. Implementations are contemplated in which data from software-based methods are not incorporated to predict a marking position, and the operations 400 omit operation 410.

Alternative implementations are contemplated in which the digital marker state probability distributions are used to generate marking position probability distributions before being coalesced or combined such that the inference engine yields marking position probability distributions at every step. In this implementation, the inference engine may use the first digital marker state probability distribution to determine a first marking position probability distribution. The inference engine may use the prior digital marker state probability distribution to determine a prior marking position probability distribution. The inference engine may combine the first marking position probability distribution and the prior marking position probability distribution to yield a second marking position probability distribution. The inference engine may take current digital marker sensor data and user interaction sensor 104 data and combine them to determine one or more of a current sensor digital marker state probability distribution and a current sensor marking position probability distribution. The inference engine may combine the second marking position probability distribution with the one or more of the current sensor digital marker state probability distribution and the current sensor marking position probability distribution. These distributions may be combined using one or more of convolution, a linear transformation, a state machine, a machine learning implementation, a Kalman filter, and other inferential methods. From this combination the inference engine may yield a third marking position probability distribution. From the third marking position probability distribution, the inference engine may directly predict a marking position or may coalesce the predicted position or the third marking position probability distribution with other software-based predictions as disclosed to predict the marking position.

Figure 5:
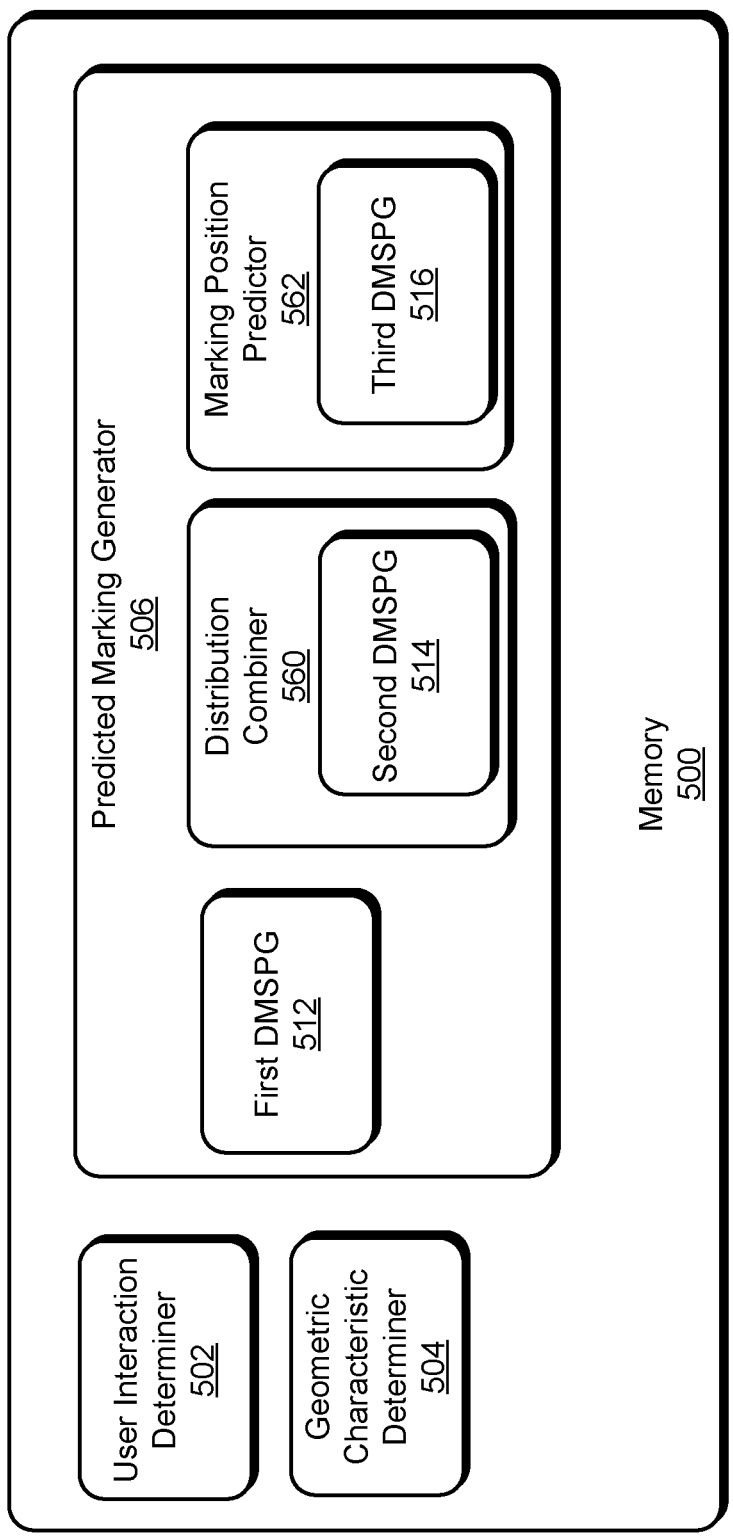
FIG. 5 illustrates an example implementation of a memory 500.

FIG. 5 illustrates an example implementation of a memory 500. The memory 500 may be an implementation of memory 606. A user interaction determiner 502 may determine user interaction data from user interaction with a user interaction sensor. In implementations, the user interaction determiner 502 may conduct any aspects of the determining operation 302. A geometric characteristic determiner 504 may determine geometric characteristics of a digital marker. In implementations, the geometric characteristic determiner 504 may conduct any aspects of the determining operation 304.

The predicted marking generator 506 generates predicted digital markings. The predicting marking generator 506 as a whole may conduct aspects of one or more of operations 306, 400, 402, 404, 406, 408, and 410. The first digital marker state probability generator (DMSPG) 512 generates a first digital marker state probability distribution, perhaps from user interaction data determined by the user interaction determiner 502. In an implementation, the first DMSPG 512 may conduct aspects of operation 402.

Distribution combiner 560 combines current digital marker state data derived from current user interaction data with prior digital marker state probability distribution data. The distribution combiner 560 may have a second DMSPG 514 to take the combined first digital marker state probability distribution and a prior digital marker state probability distribution and yield a second digital marker state probability distribution. In implementations, the distribution combiner 560 and/or the second DMSPG 514 may conduct aspects of operation 404.

Marking position predictor 562 yields a predicted marking position from the second digital maker probability distribution and current sensor data. The marking position predictor 562 may transform the second digital marker probability distribution before combining with current sensor data. The marking position predictor 562 uses a third DMSPG 516 to combine the transformed second digital marker state probability distribution with current sensor data (e.g., digital marker sensor data characteristics and/or user interaction sensor data, perhaps determined by one or more of the user interaction determiner 502 and the geometric characteristic determiner 504) and generates a third digital marker state probability distribution. From this third digital marker state probability distribution, the marking position predictor 562 predicts a marking position. In implementations, marking position predictor 562 may conduct any aspect of one or more of operations 406, 408, and 410. In implementations, the third DMSPG 616 may conduct aspects of operation 406. Embodiments are contemplated where instead of digital marker state probability distributions, marking position probability distributions are used, as discussed herein.

Figure 6:
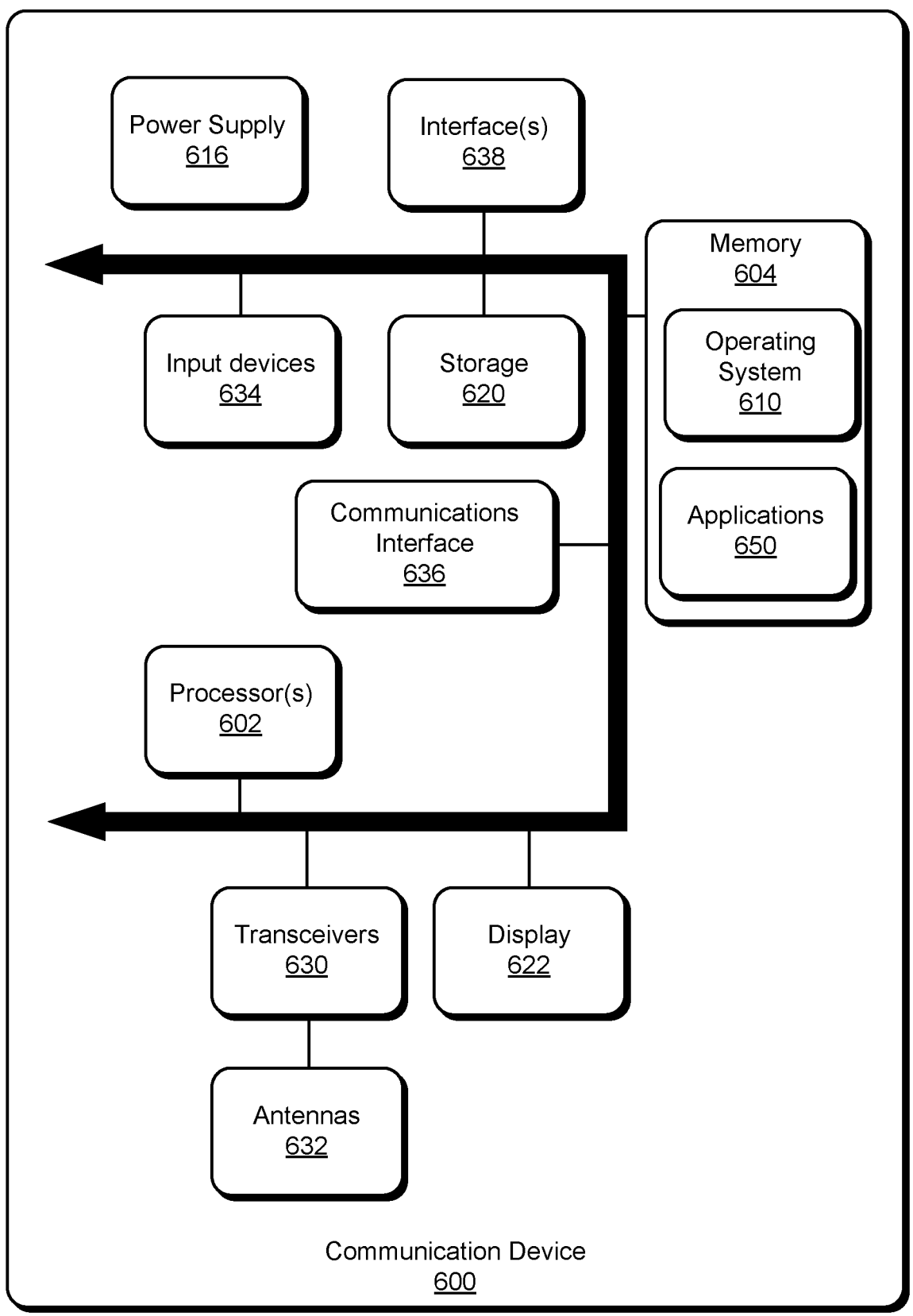
FIG. 6 illustrates an example computing device for implementing the features and operations of the described technology.

FIG. 6 illustrates an example computing device 600 for implementing the features and operations of the described technology. The computing device 600 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 600 includes one or more processor(s) 602 and a memory 604. The memory 604 generally includes both volatile memory (e.g., RAM) and nonvolatile memory (e.g., flash memory). The memory 604 may be an implementation of memory 500. An operating system 610 resides in the memory 604 and is executed by the processor(s) 602.

In an example computing device 600, as shown in FIG. 6, one or more modules or segments, such as applications 650, state machines, inferential methods, inference engines, weighting algorithms, Kalman filters, Frequency-Weighted Kalman filters, Extended Kalman filters, Unscented Kalman filters, discriminative Kalman filters, adaptive Kalman filters, Kalman-Bucy filters, hybrid Kalman filters, Kalman smoothers, alpha beta filters, inverse-variance weightings, covariance intersections, stochastic relationships, state-transition matrices, Kernel adaptive filters, recursive least squares filters, particle filter estimators, moving horizon estimators, recursive Bayesian estimators, and predictor-corrector methods, software-based predictors, operating system based predictors, averagers, median computers, statistical method modules, user interaction determiners, geometric characteristic determiners, predicted marking generators, first digital marker state probability generators, second digital marker state probability generators, third digital marker state probability generators, and capacitive sensor drivers, are loaded into the operating system 610 on the memory 604 and/or storage 620 and executed by processor(s) 602. The storage 620 may include one or more tangible storage media devices and may store digital marker state probability distributions, digital marker states, digital marker state probabilities, digital marker state uncertainties, marker state data, geometric characteristics, user interaction sensor data, user interaction patterns, digital marker data, digital markings, predicted marking positions, digital marker positions, digital marker orientations, digital marker velocities, prediction models, user postures, hand azimuths, handedness of users, user characteristics, touch pattern data, user shadow data, normal distributions, measurement data, noise in measurement data, estimated noise with uncertainties reflected in probability distributions, validated predicted marking positions, sensor-based predicted marking positions, software-based predicted marking positions, marking position probability distributions, locally and globally unique identifiers, requests, responses, and other data and be local to the computing device 600 or may be remote and communicatively connected to the computing device 600.

The computing device 600 includes a power supply 616, which is powered by one or more batteries or other power sources and which provides power to other components of the computing device 600. The power supply 616 may also be connected to an external power source that overrides or recharges the built-in batteries or other power sources.

The computing device 600 may include one or more communication transceivers 630, which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a network adapter 636, which is a type of computing device. The computing device 600 may use the adapter and any other types of computing devices for establishing connections over a wide-area network (WAN) or local-area network (LAN). It should be appreciated that the network connections shown are examples and that other computing devices and means for establishing a communications link between the computing device 600 and other devices may be used. The transceivers 630 and antennas 632 may also be configured to communicatively couple and/or communicate with a digital marker, for example, digital marker 106.

The computing device 600 may include one or more input devices 634 such that a user may enter commands and information (e.g., a keyboard or mouse). These and other input devices may be coupled to the computer system 400 by one or more interfaces 638, such as a serial port interface, parallel port, or universal serial bus (USB). The computing device 600 may further include a display 622, such as a touch screen display. The display 622 may be an implementation of the user input sensor 104, which, in an implementation, may be a capacitive touch sensor. The display 622 may be configured to receive sensor data from a digital marker, for example, digital marker 106. The display 622 may also sense a touch of the digital marker to the display 622. In other implementations, the user input sensor may be a trackpad or other non-display touchpad communicatively coupled to a system bus to facilitate sensory communication with a display 622 or touch display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up embodiments of the invention described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

An example method is provided. The example method includes operations of determining a user interaction pattern with respect to a digital marker, the user interaction pattern based at least in part on user interaction with a capacitive sensor of a computing device, determining a geometric characteristic of the digital marker, and generating a predicted digital marking position of the digital marker on a digital medium of the computing device based at least in part on the determined geometric characteristic of the digital marker and the determined user interaction pattern.

Another example method of any preceding method is provided wherein determining the predicted digital marking position of the digital marker, further including generating a first digital marker state probability distribution based at least in part on determined user interaction pattern, wherein the predicted digital marking position is generated based at least in part on the first digital marker state probability distribution.

Another example method of any preceding method is provided, wherein the determining the predicted digital marking position further includes generating a second digital marker state probability distribution based at least in part on the first digital marker state probability distribution and a prior digital marker state probability distribution.

Another example method of any preceding method is provided, wherein the determining the predicted digital marking position further includes generating a current marker state probability distribution based at least in part on the determined geometric characteristic of the digital marker, the determined user interaction pattern, and the second digital marker state probability distribution.

Another example method of any preceding method is provided, wherein the determining the user interaction pattern further includes inferentially determining at least one of user handedness, user hand size, and user hand azimuth from data generated by the capacitive sensor.

Another example method of any preceding method is provided, wherein the determining a user interaction pattern with respect to a digital marker includes detecting, with the capacitive sensor, one or more of a user touch pattern on the capacitive sensor and a shadow of a user on the capacitive sensor.

Another example method of any of the preceding example methods is provided, wherein the determining a user interaction pattern with respect to a digital marker further includes sensing, with the capacitive sensor, a pattern of user marking over time, and determining, based at least in part on the pattern of user marking over time, a characteristic of a user from which the user interaction pattern is generated.

An example computing device having a processor and a memory is provided. The processor configured to execute operations stored in the memory is provided. The computing device includes a user interaction determiner operable to determine a user interaction pattern with respect to a digital marker, the user interaction pattern being based at least in part on user interaction with a capacitive sensor of a device, a geometric characteristics determiner operable to determine a geometric characteristic of the digital marker, and a predicted marking generator operable to generate the predicted digital marking position of the digital marker based at least in part on the determined geometric characteristic of the digital marker and the determined user interaction pattern.

Another example computing device of any preceding device is provided, wherein the predicted marking generator includes a first digital marker state probability generator operable to generate a first digital marker state probability distribution based at least in part on the determined user interaction pattern, wherein the predicted marking generator generates the predicted digital marking position based further at least in part on the first digital marker state probability distribution.

Another example computing device of any preceding device is provided, wherein the predicted marking generator further includes a second digital marker state probability generator operable to generate a second digital marker state probability distribution based at least in part on the first digital marker state probability distribution and a prior digital marker state probability distribution.

Another example computing device of any preceding device is provided, wherein the predicted marking generator further includes a third digital marker state probability generator operable to generate a third marker state probability distribution based at least in part on the determined geometric characteristic of the digital marker, the determined user interaction pattern, and the second digital marker state probability distribution.

Another example computing device of any preceding device is provided, wherein the user interaction determiner is further operable to inferentially determine at least one of user handedness, user hand size, and user hand azimuth from data generated by the capacitive sensor.

Another example computing device of any preceding device is provided, wherein the user interaction determiner is further operable to detect, with the capacitive sensor, one or more of a user touch pattern on the capacitive sensor and a shadow of a user on the capacitive sensor.

Another example computing device of any preceding device is provided, wherein the user interaction determiner is further operable to sense, with the capacitive sensor, a pattern of user marking over time and determine, based at least in part on the pattern of user marking over time, a characteristic of a user from which the user interaction pattern is generated.

One or more tangible example processor-readable storage media devices encoding processor-executable instructions for executing on an electronic computing device a process is provided. The process includes determining a user interaction pattern with respect to a digital marker, the user interaction pattern being based at least in part on user interaction with a capacitive sensor of a computing device, determining a geometric characteristic of the digital marker, and generating a predicted digital marking position of the digital marker on a digital medium of the computing device based at least in part on the determined geometric characteristic of the digital marker and the determined user interaction pattern.

One or more other example tangible processor-readable storage media devices of any preceding media is provided, wherein the determining the predicted digital marking position of the digital marker, further including generating a first digital marker state probability distribution based at least in part on determined user interaction pattern, wherein the predicted digital marking position is generated based at least in part on the first digital marker state probability distribution.

One or more other example tangible processor-readable storage media devices of any preceding media is provided, wherein the determining the predicted digital marking position further includes generating a second digital marker state probability distribution based at least in part on the first digital marker state probability distribution and a prior digital marker state probability distribution.

One or more other example tangible processor-readable storage media devices of any preceding media is provided, wherein the determining the predicted digital marking position further including generating a current marker state probability distribution based at least in part on the determined geometric characteristic of the digital marker, the determined user interaction pattern, and the second digital marker state probability distribution.

One or more other example tangible processor-readable storage media devices of any preceding media is provided, wherein the determining the user interaction pattern further includes inferentially determining at least one of user handedness, user hand size, and user hand azimuth from data generated by the capacitive sensor.

One or more other example tangible processor-readable storage media devices of any preceding media is provided, wherein the determining a user interaction pattern with respect to a digital marker includes detecting, with the capacitive sensor, one or more of a user touch pattern on the capacitive sensor and a shadow of a user on the capacitive sensor.

An example system is provided including means for determining a user interaction pattern with respect to a digital marker, the user interaction pattern based at least in part on user interaction with a capacitive sensor of a computing device, means for determining a geometric characteristic of the digital marker, and means for generating a predicted digital marking position of the digital marker on a digital medium of the computing device based at least in part on the determined geometric characteristic of the digital marker and the determined user interaction pattern.

Another example system of any preceding system is provided, wherein the means for determining the predicted digital marking position of the digital marker, further includes means for generating a first digital marker state probability distribution based at least in part on the determined user interaction pattern, wherein the predicted digital marking position is generated based at least in part on the first digital marker state probability distribution.

Another example system of any preceding system is provided, wherein the means for determining the predicted digital marking position further includes means for generating a second digital marker state probability distribution based at least in part on the first digital marker state probability distribution and a prior digital marker state probability distribution.

Another example system of any preceding system is provided, wherein the means for determining the predicted digital marking position further includes means for generating a current marker state probability distribution based at least in part on the determined geometric characteristic of the digital marker, the determined user interaction pattern, and the second digital marker state probability distribution.

Another example system of any preceding system is provided, wherein the means for determining the user interaction pattern further includes means for inferentially determining at least one of user handedness, user hand size, and user hand azimuth from data generated by the capacitive sensor.

Another example system of any preceding system is provided, wherein the means for determining a user interaction pattern with respect to a digital marker includes means for detecting, with the capacitive sensor, one or more of a user touch pattern on the capacitive sensor and a shadow of a user on the capacitive sensor.

Another example system of any preceding system is provided, wherein the means for determining a user interaction pattern with respect to a digital marker further includes means for sensing, with the capacitive sensor, a pattern of user marking over time; and means for determining, based at least in part on the pattern of user marking over time, a characteristic of a user from which the user interaction pattern is generated.

While this specification contains many specific implementation details, these should not be construed as limitations on the scope of any inventions or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method, comprising:
    determining a user interaction pattern with respect to a digital marker, the user interaction pattern based at least in part on user interaction with a capacitive sensor of a computing device;
    determining a geometric characteristic of the digital marker;
    generating a first digital marker state probability distribution based at least in part on the determined user interaction pattern; and
    generating a predicted digital marking position of the digital marker on a digital medium of the computing device based at least in part on the determined geometric characteristic of the digital marker, the first digital marker state probability distribution, and the determined user interaction pattern.

2. The method of claim 1, wherein the determining the predicted digital marking position further comprising:
    generating a second digital marker state probability distribution based at least in part on the first digital marker state probability distribution and a prior digital marker state probability distribution.

3. The method of claim 2, wherein the determining the predicted digital marking position further comprising:
    generating a current marker state probability distribution based at least in part on the determined geometric characteristic of the digital marker, the determined user interaction pattern, and the second digital marker state probability distribution.

4. The method of claim 1, wherein the determining the user interaction pattern further includes inferentially determining at least one of user handedness, user hand size, and user hand azimuth from data generated by the capacitive sensor.

5. The method of claim 1, wherein the determining a user interaction pattern with respect to a digital marker includes detecting, with the capacitive sensor, one or more of a user touch pattern on the capacitive sensor and a shadow of a user on the capacitive sensor.

6. The method of claim 1, wherein the determining a user interaction pattern with respect to a digital marker further comprises:
    sensing, with the capacitive sensor, a pattern of user marking over time; and
    determining, based at least in part on the pattern of user marking over time, a characteristic of a user from which the user interaction pattern is generated.

7. A computing device having a processor and a memory, the processor configured to execute operations stored in the memory, the computing device comprising:
    a user interaction determiner operable to determine a user interaction pattern with respect to a digital marker, the user interaction pattern being based at least in part on user interaction with a capacitive sensor of a device;
    a geometric characteristics determiner operable to determine a geometric characteristic of the digital marker;
    a first digital marker state probability generator operable to generate a first digital marker state probability distribution based at least in part on the determined user interaction pattern; and
    a predicted marking generator operable to generate the predicted digital marking position of the digital marker based at least in part on the determined geometric characteristic of the digital marker, the first digital marker state probability distribution, and the determined user interaction pattern.

8. The computing device of claim 7, wherein the predicted marking generator further comprises:
    a second digital marker state probability generator operable to generate a second digital marker state probability distribution based at least in part on the first digital marker state probability distribution and a prior digital marker state probability distribution.

9. The computing device of claim 8, wherein the predicted marking generator further comprises:
    a third digital marker state probability generator operable to generate a third marker state probability distribution based at least in part on the determined geometric characteristic of the digital marker, the determined user interaction pattern, and the second digital marker state probability distribution.

10. The computing device of claim 7, wherein the user interaction determiner is further operable to inferentially determine at least one of user handedness, user hand size, and user hand azimuth from data generated by the capacitive sensor.

11. The computing device of claim 7, wherein the user interaction determiner is further operable to detect, with the capacitive sensor, one or more of a user touch pattern on the capacitive sensor and a shadow of a user on the capacitive sensor.

12. The computing device of claim 7, wherein the user interaction determiner is further operable to:
    sense, with the capacitive sensor, a pattern of user marking over time; and
    determine, based at least in part on the pattern of user marking over time, a characteristic of a user from which the user interaction pattern is generated.

13. One or more tangible processor-readable storage media devices encoding processor-executable instructions for executing on an electronic computing device a process, the process comprising:
    determining a user interaction pattern with respect to a digital marker, the user interaction pattern being based at least in part on user interaction with a capacitive sensor of a computing device;
    determining a geometric characteristic of the digital marker;
    generating a first digital marker state probability distribution based at least in part on determined user interaction pattern; and
    generating a predicted digital marking position of the digital marker on a digital medium of the computing device based at least in part on the determined geometric characteristic of the digital marker, the first digital marker state probability distribution, and the determined user interaction pattern.

14. The one or more tangible processor-readable storage media devices of claim 13, wherein the determining the predicted digital marking position further comprising:
    generating a second digital marker state probability distribution based at least in part on the first digital marker state probability distribution and a prior digital marker state probability distribution.

15. The one or more tangible processor-readable storage media devices of claim 14, wherein the determining the predicted digital marking position further comprising:
    generating a current marker state probability distribution based at least in part on the determined geometric characteristic of the digital marker, the determined user interaction pattern, and the second digital marker state probability distribution.

16. The one or more tangible processor-readable storage media devices of claim 15, wherein the determining the user interaction pattern further includes inferentially determining at least one of user handedness, user hand size, and user hand azimuth from data generated by the capacitive sensor.

17. The one or more tangible processor-readable storage media devices of claim 16, wherein the determining a user interaction pattern with respect to a digital marker includes detecting, with the capacitive sensor, one or more of a user touch pattern on the capacitive sensor and a shadow of a user on the capacitive sensor.

* * * * *